US008861712B2

(12) United States Patent
Zhou et al.

(10) Patent No.: US 8,861,712 B2
(45) Date of Patent: Oct. 14, 2014

(54) METHOD, APPARATUS, AND SYSTEM FOR REDUCING LINE-TO-LINE CROSSTALK DURING TRANSMISSION OF DIGITAL SUBSCRIBER LINE SERVICE

(71) Applicant: Huawei Technologies Co., Ltd., Shenzhen (CN)

(72) Inventors: Lang Zhou, Shenzhen (CN); Jianping Tu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/098,654

(22) Filed: Dec. 6, 2013

(65) Prior Publication Data
US 2014/0093067 A1 Apr. 3, 2014

Related U.S. Application Data

(63) Continuation of application No. PCT/CN2011/075362, filed on Jun. 7, 2011.

(51) Int. Cl.
H04M 9/08 (2006.01)
H04B 3/32 (2006.01)
H04M 3/30 (2006.01)

(52) U.S. Cl.
CPC  H04B 3/32 (2013.01); H04M 3/304 (2013.01)
USPC .................................................. 379/406.01

(58) Field of Classification Search
USPC ........................ 379/406.01–406.16
See application file for complete search history.

(56) References Cited

U.S. PATENT DOCUMENTS

| 7,782,837 B2 | 8/2010 | Slabbinck et al. |
| 2006/0095581 A1* | 5/2006 | Ali et al. ........................ 709/232 |
| 2008/0212768 A1 | 9/2008 | Zhou |
| 2010/0027601 A1 | 2/2010 | Fang |
| 2010/0246606 A1 | 9/2010 | Cendrillon et al. |
| 2010/0296648 A1 | 11/2010 | Fang et al. |

FOREIGN PATENT DOCUMENTS

| CN | 1863078 | 11/2006 |
| CN | 1866938 | 11/2006 |
| CN | 101399575 | 4/2009 |
| CN | 101505177 | 8/2009 |

OTHER PUBLICATIONS

International Telecommunication Union: Telecommunication Standardization Sector, "Series G: Transmission Systems and Media, Digital Systems and Networks: Digital Sections and digital line system—Access networks" Recommendation ITU-T G.993.2 (2006)—Corrigendum 4. Apr. 2011.

* cited by examiner

Primary Examiner — Simon Sing
(74) Attorney, Agent, or Firm — Staas & Halsey LLP

(57) ABSTRACT

A method, an apparatus, and a system for reducing line-to-line crosstalk during transmission of a digital subscriber line service are disclosed, where the method includes: before a service is provisioned, obtaining, by a service provider according to a service transmission rate and a topology scenario parameter that are provided by a service receiving side device, a power spectral density of a line in a process of receiving a service by the service receiving side device; and provisioning, by the service provider, a service for the service receiving side device according to the power spectral density.

10 Claims, 6 Drawing Sheets

METHOD, APPARATUS, AND SYSTEM FOR REDUCING LINE-TO-LINE CROSSTALK DURING TRANSMISSION OF DIGITAL SUBSCRIBER LINE SERVICE

CROSS-REFERENCE TO RELATED APPLICATIONS

This application is a continuation of International Application No. PCT/CN2011/075362, filed on Jun. 7, 2011, which is hereby incorporated by reference in its entirety.

TECHNICAL FIELD

Embodiments of the present invention relate to the field of communication technologies, and in particular, to a method, an apparatus, and a system for reducing line-to-line crosstalk during transmission of a digital subscriber line service.

BACKGROUND

A digital subscriber line (DSL) technology is a high speed transmission technology that implements data transmission by using a telephone twisted pair, that is, an unshielded twisted pair (UTP), where DSLs include an asymmetrical digital subscriber line (ADSL), a very-high-bit-rate digital subscriber line (VDSL), an integrated services digital network digital subscriber line (IDSL), a single-pair high-bit-rate digital subscriber line (SHDSL)), and the like. The foregoing several digital subscriber lines are referred to as an xDSL below.

Of various digital subscriber line technologies (xDSL), except DSLs using baseband transmission, such as the IDSL and the SHDSL, a DSL using passband transmission allows the DSL and a plain old telephone service (POTS) to coexist in a same twisted pair by using a frequency division multiplexing technology, where the DSL occupies a high frequency band and the POTS occupies a baseband part smaller than 4 kHz.

Generally, each user cable basically includes a plurality of twisted pairs (25 pairs or more), and multiple different services may be run over each twisted pair. Crosstalk occurs between various types of xDSLs when these xDSLs work simultaneously. Performance of some subscriber lines may dramatically decrease due to the crosstalk, and what's worse, when some subscriber lines are relatively long, any DSL service cannot be enabled over these subscriber lines due to the crosstalk.

To reduce line-to-line crosstalk, the prior art provides the following two solutions:

One solution is as follows: After a service is provisioned, a max margin used for activating a line is controlled by collecting a running parameter and by using a max margin (maximum noise margin) algorithm of a dynamic line management (DLM), so that the amount of total sending power can be controlled and the line-to-line crosstalk can be reduced. However, this solution is implemented after the service is provisioned, which does not meet an operation and maintenance habit of a telecom operator. The ideal case should be that all template parameters are determined before the service is provisioned. In this case, quality of the service complies with the requirement after the service is provisioned, and resources and control costs in subsequent optimization should be reduced as many as possible, so as to increase user satisfaction of enabling the service. In addition, the max margin is a level value, which makes the control on the max margin of the line less precise.

The other solution is as follows: After a service is provisioned, a power spectral density (PSD) of the line is calculated by collecting a running parameter and by using a dynamic spectrum management (DSM) L2 algorithm; a sending power spectrum density of the line is controlled by using an optimization algorithm, so that crosstalk impact is imposed as minor as possible on lines in a same cable bundle during working, thereby reducing the line-to-line crosstalk. However, this solution is also implemented after the service is provisioned, which does not meet an operation and maintenance habit of a telecom operator. In addition, the DSM L2 algorithm requires collection of a large amount of data to calculate crosstalk between two lines, and the algorithm is optimized according to a crosstalk channel, which is highly complex. Furthermore, a large amount of data is collected, the operation amount of the algorithm is very large, and an optimization period is very long.

Evidently, how to reduce line-to-line crosstalk during transmission of a digital subscriber line service through spectral planning in the case of service provisioning is a problem that needs to be urgently solved in the prior art.

SUMMARY

To solve the foregoing technical problem in the background, the present invention provides a method, an apparatus, and a system for reducing line-to-line crosstalk during transmission of a digital subscriber line service, so that line-to-line crosstalk during transmission of a digital subscriber line service can be reduced.

The technical solution of the present invention is as follows:

An embodiment of the present invention provides a method for reducing line-to-line crosstalk during transmission of a digital subscriber line service, where the method includes:

before a service is provisioned, obtaining, by a service provider according to a service transmission rate and a topology scenario parameter that are provided by a service receiving side device, a power spectral density of a line in a process of receiving a service by the service receiving side device; and provisioning, by the service provider, a service for the service receiving side device according to the power spectral density.

An apparatus for reducing line-to-line crosstalk during transmission of a digital subscriber line service includes:

a power spectral density determining module, configured to, before a service is provisioned, obtain, according to a service transmission rate and a topology scenario parameter that are provided by a service receiving side device, a power spectral density of a line in a process of receiving a service by the service receiving side device; and a service provisioning control module, configured to control, according to the power spectral density, a service provider to provision a service for the service receiving side device.

A system for transmitting a digital subscriber line service includes a service provider and a service receiving side device, where the service provider is configured to, before a service is provisioned, obtain, according to a service transmission rate and a topology scenario parameter that are provided by the service receiving side device, a power spectral density of a line in a process of receiving a service by the service receiving side device; and provision a service for the service receiving side device according to the power spectral density.

In the embodiments of the present invention, by knowing only such topology scenario parameters as a port wire length and a wire diameter and a service transmission rate of a service receiving side device, a service provider is capable of providing a power spectral density of a line between the service provider and the service receiving side device before a service is provisioned without the need of knowing which specific ports exist in a same cable bundle. In this way, the amount of crosstalk of the line during transmission of a digital subscriber line service is reduced, an overall line rate is increased, and power consumption is reduced. In the embodiments of the present invention, because the power spectral density of the line is planned before the service is sent, spectral optimization can be reduced after the service is enabled, thereby improving user satisfaction.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

In the prior art, to reduce line-to-line crosstalk, spectral optimization of a line is generally implemented during transmission of a digital subscriber line service after a service is provisioned.

Figure 1:
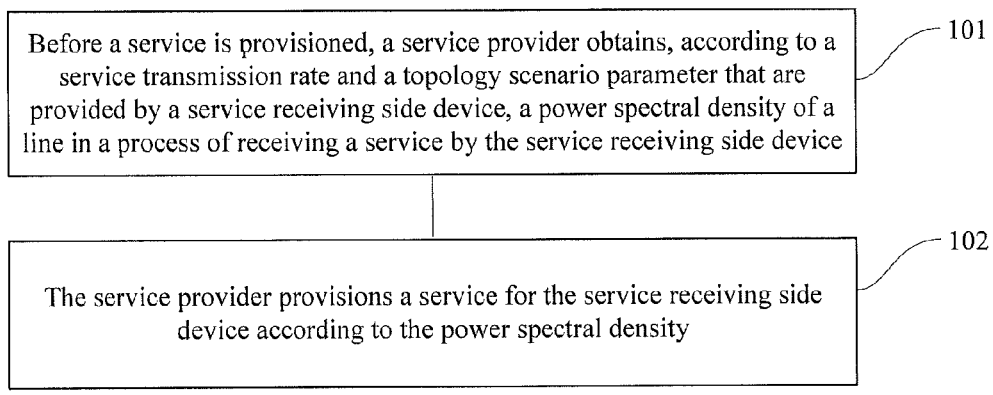
FIG. 1 is a schematic flowchart of a method for reducing line-to-line crosstalk during transmission of a digital subscriber line service according to an embodiment of the present invention.

To avoid the foregoing drawback, this embodiment of the present invention provides a method for reducing line-to-line crosstalk during transmission of a digital subscriber line service. As shown in FIG. 1, the method may include the following steps:

Step 101: Before a service is provisioned, a service provider obtains, according to a service transmission rate and a topology scenario parameter that are provided by a service receiving side device, a power spectral density of a line in a process of receiving a service by the service receiving side device.

In this step, the line topology scenario parameter may include information about the number of wire pairs, a wire length, and a wire diameter in a same cable bundle in the line.

In combination with the service transmission rate and the foregoing topology scenario parameter that are provided by the service receiving side device, a service provider is capable of obtaining, before the service is provisioned, a power spectral density of the line in a process of receiving a service by the service receiving side device.

During specific implementation, an implementation manner of acquiring, by the service provider, a service transmission rate and a topology scenario parameter that are provided by the service receiving side device may be as follows: After the service provider determines a service receiving side device that requires service transmission, the service provider initiates a request message for acquiring a current service transmission rate and a topology scenario parameter to the service receiving side device; then, the service receiving side device feeds back, according to the request message, a corresponding service transmission rate and topology scenario parameter information to the service provider.

Step 102: The service provider provisions a service for the service receiving side device according to the power spectral density.

After obtaining the power spectral density of the line in the process of receiving the service by the service receiving side device, the service provider provisions a service according to the power spectral density, thereby avoiding that spectral optimization of the line is continued after the service is enabled.

In this embodiment of the present invention, by knowing only such topology scenario parameters as a port wire length and a wire diameter and a service transmission rate of a service receiving side device, a service provider is capable of providing a power spectral density of a line between the service provider and the service receiving side device before a service is sent, without the need of knowing which specific ports exist in a same cable bundle. In this way, the amount of crosstalk of the line during transmission of a digital subscriber line service is reduced, an overall line rate is increased, and power consumption is reduced. In this embodiment of the present invention, because the power spectral density of the line is planned before the service is sent, spectral optimization can be reduced after the service is enabled, thereby improving user satisfaction.

Embodiment 2

Figure 2:
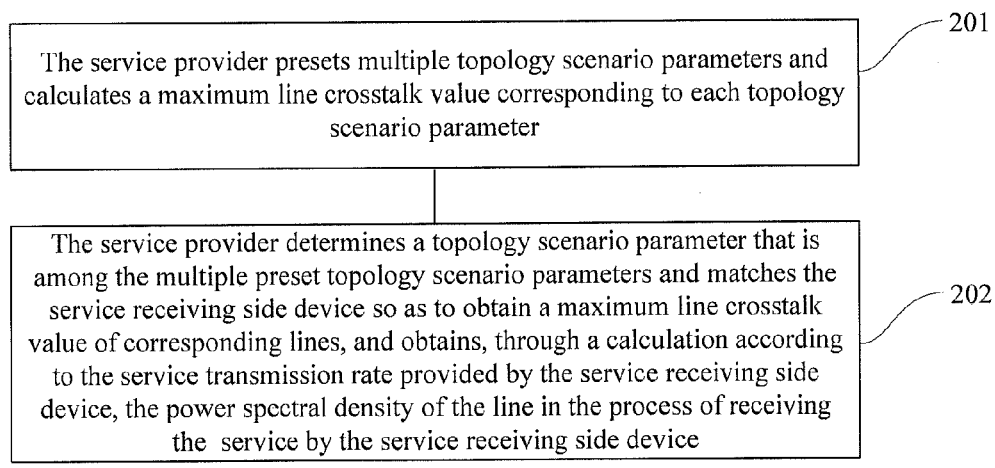
FIG. 2 is a schematic flowchart of an implementation process of step 101 illustrated in FIG. 1.

In this embodiment of the present invention, as shown in FIG. 2, an implementation manner of "obtaining, by a service provider according to a service transmission rate and a topology scenario parameter that are provided by a service receiving side device, a power spectral density of a line in a process of receiving a service by the service receiving side device" in the foregoing step 101 is as follows:

Step 201: The service provider presets multiple topology scenario parameters and calculates a maximum line crosstalk value corresponding to each topology scenario parameter.

Step 202: The service provider determines a topology scenario parameter that is among the multiple preset topology scenario parameters and matches the service receiving side device so as to obtain a maximum line crosstalk value of corresponding lines, and obtains, through a calculation according to the service transmission rate provided by the service receiving side device, the power spectral density of the line in the process of receiving the service by the service receiving side device.

It should be noted that to facilitate quick calculation of the power spectral density of the line by the service provider when provisioning a service, multiple typical line topology scenarios can be preset to calculate a maximum line crosstalk value corresponding to each line topology scenario. A second generation VDSL (VDSL2) technology is used as an example in which a long wire pair and a short wire pair are included in a same cable bundle in a line. Crosstalk suffered by a long wire, namely FEXT (far end crosstalk), is shown in the following equation:

$$FEXT_{VDSL}(f) = PSD_{VDSL}(f) \cdot h(f, d1+d2) \cdot X_F f^2 \cdot d1 \cdot n_1^{0.6} + PSD_{VDSL}(f) \cdot h(f, d1+d2) \cdot X_F f^2 \cdot (d1+d2) \cdot n_2^{0.6}$$

Crosstalk suffered by a short wire, namely FEXT, is shown in the following equation:

$$FEXT_{VDSL}(f) = PSD_{VDSL}(f) \cdot h(f, d1) \cdot X_F f^2 \cdot d1 \cdot n_1^{0.6}$$

where, d1 refers to a distance of the short wire; d1+d2 refers to a distance of the long wire; n1 refers to the number of wire pairs with the wire length of d1; $n_2$ refers to the number of wire pairs with the wire length of (d1+d2); $X_F$ refers to a far end crosstalk coupling coefficient; and h(f, d1+d2) refers to a line transfer function.

According to the foregoing crosstalk calculation method, a maximum theoretical value of crosstalk possibly suffered by each wire pair can be obtained. When maximum theoretical crosstalk suffered by a wire pair is calculated, it is assumed that other wire pairs use a maximum PSD for transmission, the far end crosstalk coupling coefficient $X_F$ correspondingly takes the maximum value.

In addition, the maximum theoretical value of crosstalk possibly suffered by each wire pair is calculated using the VDSL2 scenario as an example only; when the scenario changes, the calculation of the maximum theoretical value of crosstalk correspondingly changes. Related technologies are common knowledge of a person skilled in the art, which are not further described in detail in the present invention.

After obtaining the topology scenario parameter actually provided by the service receiving side device, the service provider matches the currently obtained topology scenario parameter with a preset typical topology scenario parameter; if the parameters are matched, it indicates that the topology scenario actually provided by the service receiving side device is the same as a preset typical topology scenario. In this case, a maximum theoretical value of crosstalk suffered by each wire pair in the line between the service provider and the service receiving side device is the maximum theoretical value of crosstalk suffered by each wire pair in the typical topology scenario. At this time, in combination with the service transmission rate provided by the service receiving side device, the service provider is capable of obtaining, through a calculation, a PSD of the line in the process of receiving the service by the service receiving side device.

The calculation methods for obtaining a PSD may include a water injection algorithm and a Shannon equation. A specific calculation process is common knowledge of a person skilled in the art, which is not further described in detail herein.

Embodiment 3

In the foregoing embodiment, the PSD of the line is obtained through calculation directly after the topology scenario parameters are matched. In an actual application, a value of a PSD required for service provisioning currently may be the same as a value of a PSD required for service provisioning previously. Therefore, if the service provider executes a calculation of a PSD each time when it provisions a service, the service provider may perform a repeated calculation process.

Figure 3:
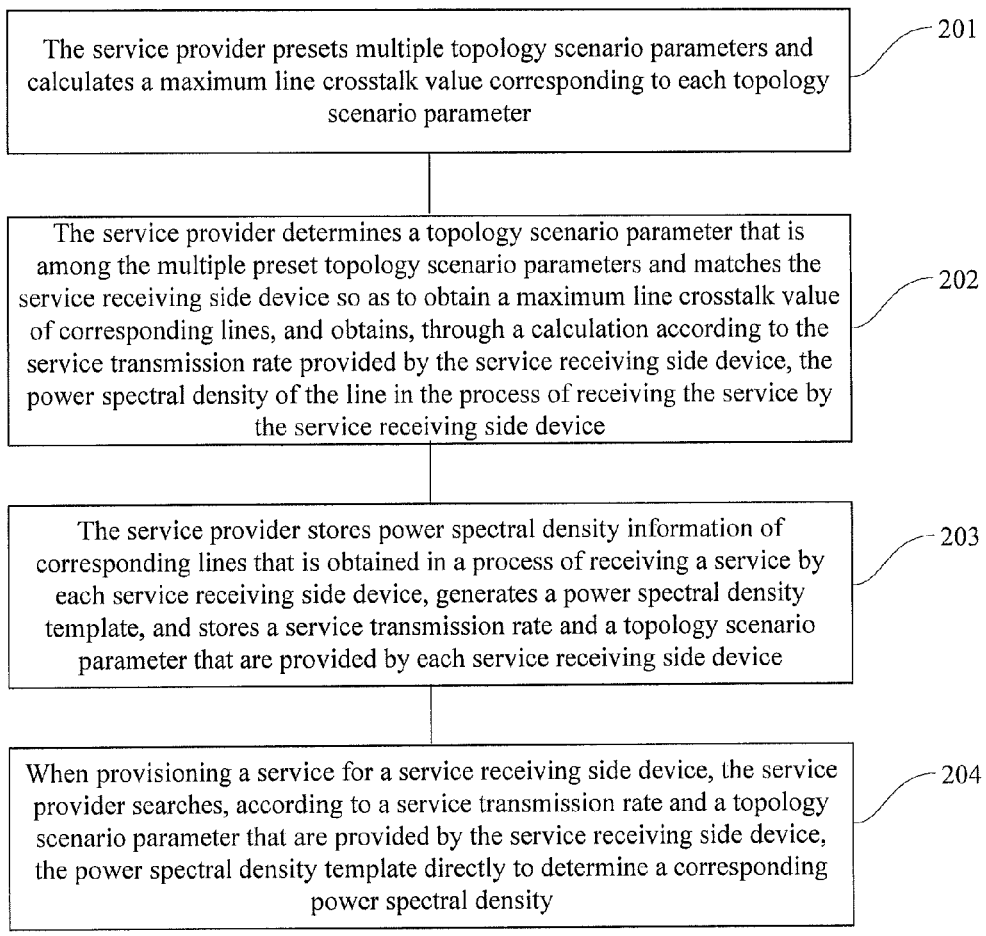
FIG. 3 is a schematic flowchart of another implementation process of step 101 illustrated in FIG. 1.

To reduce repeated PSD calculations executed by the service provider, in another embodiment provided in the present invention, as shown in FIG. 3, the implementation manner of the foregoing step 101 further includes:

Step 203: The service provider stores power spectral density information of corresponding lines that is obtained in a process of receiving a service by each service receiving side device, generates a power spectral density template, and stores a service transmission rate and a topology scenario parameter that are provided by each service receiving side device.

In this step, the service provider generates a PSD template, where the template records PSD information of corresponding lines that is obtained through a calculation by the service provider in a process of receiving a service by each service receiving side device. In addition, the template further records a service transmission rate and a topology scenario parameter corresponding to information of each PSD and provided by a corresponding service receiving side device.

The following table shows a PSD template provided in this embodiment of the present invention, where a service transmission rate and a topology scenario parameter that correspond to each PSD are shown.

TABLE 1

| PSD template | | |
| --- | --- | --- |
| Line topology scenario parameter | Service transmission rate | PSD |
| ... | 4 Mbps | [128: −50, ...] |
| ... | 4 Mbps | [128: −65, ...] |
| ... | 2 Mbps | [128: −75, ...] |

Step 204: When provisioning a service for a service receiving side device, the service provider searches, according to a service transmission rate and a topology scenario parameter that are provided by the service receiving side device, the power spectral density template directly to determine a corresponding power spectral density.

By using this step, when the service provider needs to provision a service for a service receiving side device, the service provider does not calculate a PSD value directly, but first searches the power spectral density template directly for whether PSD information matching the service transmission rate and the topology scenario parameter that are provided by the service receiving side device exists. If such PSD information exists, the service provider provisions a service directly according to the PSD information; if no such PSD information exists, the service provider performs a corresponding PSD calculation.

By using this embodiment of the present invention, a repeated calculation process caused by a PSD calculation executed by a service provider each time when it provisions a service can be avoided.

Embodiment 4

Figure 4:
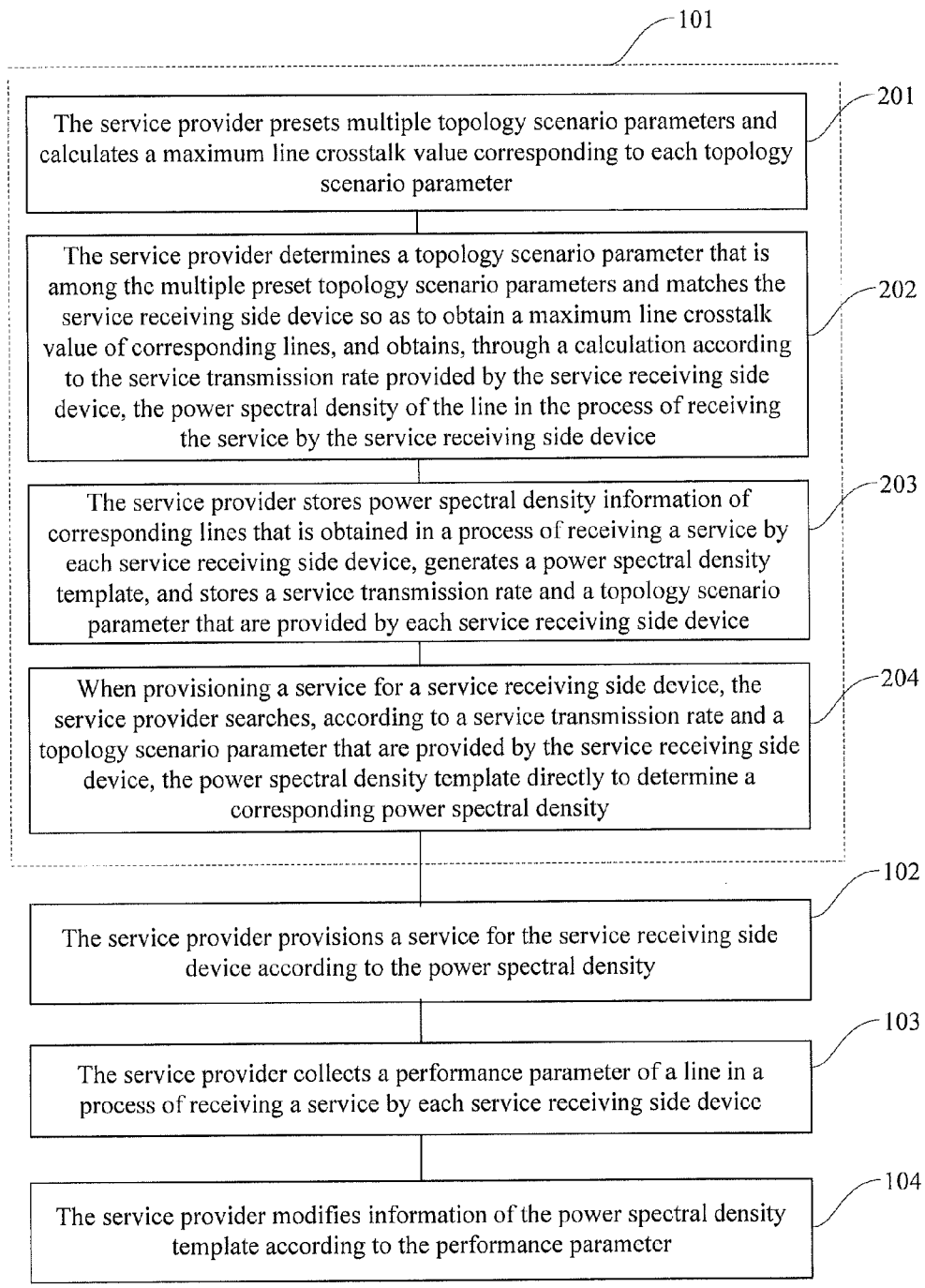
FIG. 4 is a schematic flowchart of another method for reducing line-to-line crosstalk during transmission of a digital subscriber line service according to an embodiment of the present invention.

To increase accuracy of a PSD template, in this embodiment of the present invention, as shown in FIG. 4 and on the basis of FIG. 3, the method further includes:

Step 103: The service provider collects a performance parameter of a line in a process of receiving a service by each service receiving side device.

In this step, after provisioning a service according to a corresponding PSD, the service provider collects a performance parameter of a line in a process of receiving a service by each service receiving side device, so as to monitor whether the PSD planning can really achieve an effect of reducing line-to-line crosstalk.

Step 104: The service provider modifies information of the power spectral density template according to the performance parameter.

In this step, if the service provider monitors that after a service is provisioned according to a PSD, an expected effect of reducing the line-to-line crosstalk fails to be achieved, the service provider may modify the generated PSD template according to a collected related performance parameter of the line.

In this embodiment of the present invention, more accurate PSD information is provided by modifying a PSD template. In this way, an effect of reducing line-to-line crosstalk can be further enhanced.

Embodiment 5

Figure 5:
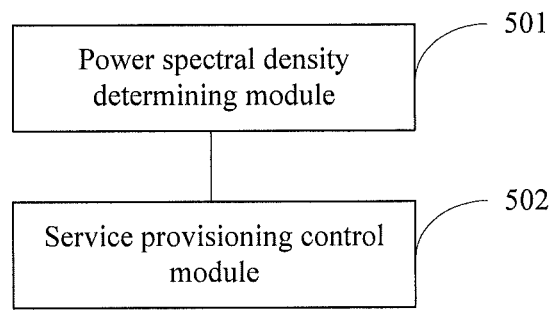
FIG. 5 is a schematic diagram of an apparatus for reducing line-to-line crosstalk during transmission of a digital subscriber line service according to an embodiment of the present invention.

Correspondingly, this embodiment of the present invention further provides an apparatus for reducing line-to-line crosstalk during transmission of a digital subscriber line service. As shown in FIG. 5, the apparatus may specifically include:

a power spectral density determining module 501, configured to, before a service is provisioned, obtain, according to a service transmission rate and a topology scenario parameter that are provided by a service receiving side device, a power spectral density of a line in a process of receiving a service by the service receiving side device; and a service provisioning control module 502, configured to control, according to the power spectral density, a service provider to provision a service for the service receiving side device.

By knowing only such topology scenario parameters as a port wire length and a wire diameter and a service transmission rate of a service receiving side device, this apparatus is capable of providing a power spectral density of a line between a service provider and the service receiving side device before a service is sent, without the need of knowing which specific ports exist in a same cable bundle. In this way, the amount of crosstalk of the line during transmission of a digital subscriber line service is reduced, an overall line rate is increased, and power consumption is reduced. In this embodiment of the present invention, because the power spectral density of the line is planned before the service is sent, spectral optimization can be reduced after the service is enabled, thereby improving user satisfaction.

During specific implementation, an implementation manner of acquiring, by the service provider, a service transmission rate and a topology scenario parameter that are provided by the service receiving side device may be as follows: After the service provider determines a service receiving side device that requires service transmission, the service provider initiates a request message for acquiring a current service transmission rate and a topology scenario parameter to the service receiving side device; then, the service receiving side device feeds back, according to the request message, a corresponding service transmission rate and topology scenario parameter information to the service provider.

Figure 6:
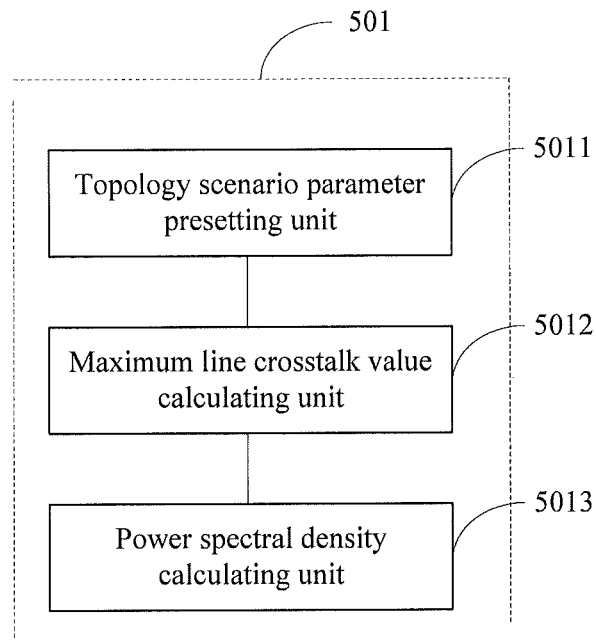
FIG. 6 is a schematic structural diagram of a power spectral density determining module illustrated in FIG. 5.

As shown in FIG. 6, the power spectral density determining module 501 specifically includes:

a topology scenario parameter presetting unit 5011, configured to preset multiple topology scenario parameters;

a maximum line crosstalk value calculating unit 5012, configured to calculate a maximum line crosstalk value corresponding to each topology scenario parameter; and a power spectral density calculating unit 5013, configured to determine a topology scenario parameter that is among the multiple preset topology scenario parameters and matches the service receiving side device so as to obtain a maximum line crosstalk value of corresponding lines, and obtain, through a calculation according to the service transmission rate provided by the service receiving side device, the power spectral density of the line in the process of receiving the service by the service receiving side device.

Figure 7:
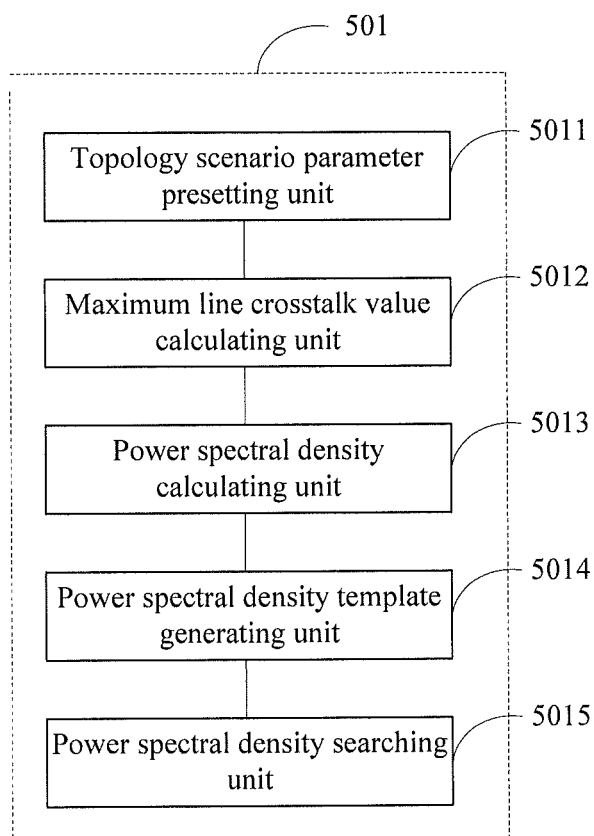
FIG. 7 is another schematic structural diagram of a power spectral density determining module illustrated in FIG. 5.

In another apparatus provided in the present invention, as shown in FIG. 7, the power spectral density determining module 501 further includes:

a power spectral density template generating unit 5014, configured to store power spectral density information of corresponding lines that is obtained in a process of receiving a service by each service receiving side device, generate a power spectral density template, and store a service transmission rate and a topology scenario parameter that are provided by each service receiving side device; and a power spectral density searching unit 5015, configured to, when a service is provisioned for a service receiving side device, search, according to a service transmission rate and a topology scenario parameter that are provided by the service receiving side device, the power spectral density template directly to determine a corresponding power spectral density.

Figure 8:
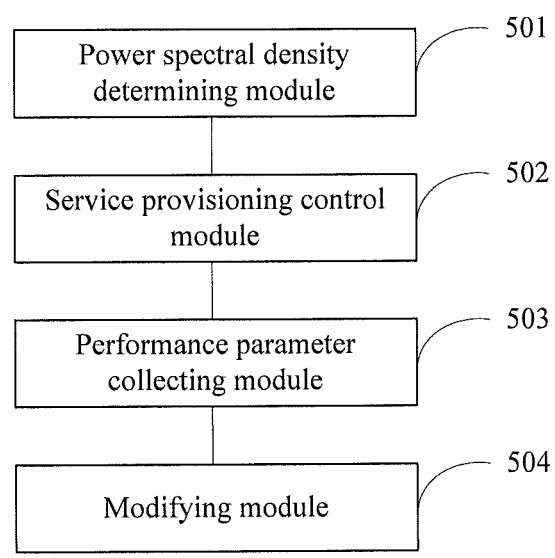
FIG. 8 is a schematic diagram of another apparatus for reducing line-to-line crosstalk during transmission of a digital subscriber line service according to an embodiment of the present invention.

In still another apparatus provided in the present invention, as shown in FIG. 8, the apparatus further includes:

a performance parameter collecting module 503, configured to collect a performance parameter of a line in a process of receiving a service by each service receiving side device; and a modifying module 504, configured to modify information of the power spectral density template according to the performance parameter.

Embodiment 6

This embodiment of the present invention provides a system for transmitting a digital subscriber line service, where the system includes a service provider and a service receiving side device. The service provider is configured to, before a service is provisioned, obtain, according to a service transmission rate and a topology scenario parameter that are provided by the service receiving side device, a power spectral density of a line in a process of receiving a service by the service receiving side device; and provision a service for the service receiving side device according to the power spectral density.

In this system, by knowing only such topology scenario parameters as a port wire length and a wire diameter and a service transmission rate of a service receiving side device, a service provider is capable of providing a power spectral density of a line between the service provider and the service receiving side device before a service is sent, without the need of knowing which specific ports exist in a same cable bundle. In this way, the amount of crosstalk of the line during transmission of a digital subscriber line service is reduced, an overall line rate is increased, and power consumption is reduced. In this embodiment of the present invention, because the power spectral density of the line is planned before the service is sent, spectral optimization can be reduced after the service is enabled, thereby improving user satisfaction.

It should be noted that the service provider presets multiple topology scenario parameters, calculates a maximum line crosstalk value corresponding to each topology scenario parameter, determines a topology scenario parameter that is among the multiple preset topology scenario parameters and matches the service receiving side device so as to obtain a maximum line crosstalk value of corresponding lines, and obtains, through a calculation according to the service transmission rate provided by the service receiving side device, the power spectral density of the line in the process of receiving the service by the service receiving side device.

During specific implementation, an implementation manner of acquiring, by the service provider, a service transmission rate and a topology scenario parameter that are provided by the service receiving side device may be as follows: After the service provider determines a service receiving side device that requires service transmission, the service provider initiates a request message for acquiring a current service transmission rate and a topology scenario parameter to the service receiving side device; then, the service receiving side device feeds back, according to the request message, a corresponding service transmission rate and topology scenario parameter information to the service provider.

In addition, the service provider is further configured to:

store power spectral density information of corresponding lines that is obtained in a process of receiving a service by each service receiving side device, generate a power spectral density template, and store a service transmission rate and a topology scenario parameter that are provided by each service receiving side device; and when a service is provisioned for a service receiving side device, search, according to a service transmission rate and a topology scenario parameter that are provided by the service receiving side device, the power spectral density template directly to determine a corresponding power spectral density.

In another embodiment provided in the present invention, the service provider is further configured to:

collect a performance parameter of a line in a process of receiving a service by each service receiving side device; and modify information of the power spectral density template according to the performance parameter.

For the apparatus and system embodiments, since they are basically similar to the method embodiments, the descriptions are relatively simple. For related content, refer to the part of the descriptions of the method embodiments. The described system embodiment is merely exemplary. The modules that are described as split parts may or may not be split physically, and parts displayed as modules may or may not be physical modules, may be located at one place, or may be distributed on multiple network modules. A part or all of the modules may be selected according to actual needs to achieve the objective of the solutions of the embodiments. A person of ordinary skill in the art may understand and implement the solutions without creative efforts.

The foregoing descriptions disclosed the embodiments allow a person skilled in the art to implement or use the present invention. Multiple modifications made to these embodiments are apparent for a person skilled in the art. The general principle defined in the document may be implemented in other embodiments without departing from the spirit or scope of the embodiments of the present invention. Therefore, the embodiments of the present invention will not be limited to the embodiments described in the document but extends to the widest scope that complies with the principle and novelty disclosed in the document.

What is claimed is:

1. A method for reducing line-to-line crosstalk during transmission of a digital subscriber line service, comprising:
    obtaining, by a service provider, a power spectral density of a line in a process of receiving a service by a service receiving side device before a service is provisioned, the obtaining being according to a service transmission rate and a topology scenario parameter that are provided by the service receiving side device; and
    provisioning, by the service provider, a service for the service receiving side device according to the power spectral density,
    wherein the obtaining comprises:
        presetting, by the service provider, multiple topology scenario parameters, and calculating a maximum line crosstalk value corresponding to each topology scenario parameter; and
        determining, by the service provider, a topology scenario parameter that is among the multiple preset topology scenario parameters and matches the service receiving side device so as to obtain a maximum line crosstalk value of corresponding lines, and obtaining the power spectral density, through a calculation according to the service transmission rate provided by the service receiving side device.

2. The method according to claim 1, wherein the service provider acquires, by initiating a request message for acquiring a current service transmission rate and topology scenario parameter to the service receiving side device, a corresponding service transmission rate and topology scenario parameter that are fed back by the service receiving side device to the service provider according to the request message.

3. The method according to claim 1, wherein the obtaining further comprises:
    storing, by the service provider, power spectral density information of corresponding lines that is obtained in a process of receiving a service by each service receiving side device, generating a power spectral density template, and storing a service transmission rate and a topology scenario parameter that are provided by each service receiving side device; and
    when the service is provisioned for the service receiving side device, searching, by the service provider according to the service transmission rate and the topology scenario parameter that are provided by the service receiving side device, the power spectral density template to determine a corresponding power spectral density.

4. The method according to claim 3, wherein the obtaining further comprises:
    collecting, by the service provider, a performance parameter of a line in a process of receiving a service by each service receiving side device; and
    modifying, by the service provider, information of the power spectral density template according to the performance parameter.

5. The method according to claim 1, wherein the topology scenario parameter comprises:
    information about a number of wire pairs, a wire length, and a wire diameter in a same cable bundle in the line.

6. An apparatus for reducing line-to-line crosstalk during transmission of a digital subscriber line service, comprising:
    a power spectral density determining module, configured to, obtain a power spectral density of a line in a process of receiving a service by a service receiving side device before a service is provisioned, the power spectral density being obtained according to a service transmission rate and a topology scenario parameter provided by the service receiving side device; and a service provisioning control module, configured to control, according to the power spectral density, a service provider to provision a service for the service receiving side device, and wherein the power spectral density determining module comprises:
- a topology scenario parameter presetting unit, configured to preset multiple topology scenario parameters;
- a maximum line crosstalk value calculating unit, configured to calculate a maximum line crosstalk value corresponding to each topology scenario parameter; and
- a power spectral density calculating unit, configured to determine a topology scenario parameter that is among the multiple preset topology scenario parameters and matches the service receiving side device so as to obtain a maximum line crosstalk value of corresponding lines, and obtain the power spectral density, through a calculation according to the service transmission rate provided by the service receiving side device.

7. The apparatus according to claim 6, wherein the power spectral density determining module further comprises:

a power spectral density template generating unit, configured to store power spectral density information of corresponding lines that is obtained in a process of receiving a service by each service receiving side device, generate a power spectral density template, and store a service transmission rate and a topology scenario parameter that are provided by each service receiving side device; and a power spectral density searching unit, configured to, when the service is provisioned for the service receiving side device, search, according to the service transmission rate and the topology scenario parameter that are provided by the service receiving side device, the power spectral density template directly to determine a corresponding power spectral density.

8. The apparatus according to claim 7, further comprising:

a performance parameter collecting module, configured to collect a performance parameter of a line in a process of receiving a service by each service receiving side device; and a modifying module, configured to modify information of the power spectral density template according to the performance parameter.

9. A system for transmitting a digital subscriber line service, comprising:

a service provider; and a service receiving side device, wherein:

the service provider is configured to, before a service is provisioned, obtain a power spectral density of a line in a process of receiving a service by the service receiving side device according to a service transmission rate and a topology scenario parameter that are provided by the service receiving side device, and provision a service for the service receiving side device according to the power spectral density, and wherein the service provider presets multiple topology scenario parameters and calculates a maximum line crosstalk value corresponding to each topology scenario parameter, determines a topology scenario parameter that is among the multiple preset topology scenario parameters and matches the service receiving side device so as to obtain a maximum line crosstalk value of corresponding lines, and obtains the power spectral density, through a calculation according to the service transmission rate provided by the service receiving side device.

10. The system according to claim 9, wherein the service provider is further configured to:

store power spectral density information of corresponding lines that is obtained in a process of receiving a service by each service receiving side device, and generate a power spectral density template, and store a service transmission rate and a topology scenario parameter that are provided by each service receiving side device, and when the service is provisioned for the service receiving side device, search, according to the service transmission rate and the topology scenario parameter that are provided by the service receiving side device, the power spectral density template directly to determine a corresponding power spectral density.

* * * * *